United States Patent
Oh et al.

(10) Patent No.: US 10,736,142 B2
(45) Date of Patent: Aug. 4, 2020

(54) METHOD AND APPARATUS FOR DETECTING CHANNEL IN MOBILE COMMUNICATION SYSTEM OPERATING IN UNLICENSED BAND

(71) Applicant: Samsung Electronics Co., Ltd., Suwon-si (KR)

(72) Inventors: Jinyoung Oh, Seoul (KR); Hyojin Lee, Suwon-si (KR); Juho Lee, Suwon-si (KR); Hyoungju Ji, Seoul (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 15/532,985

(22) PCT Filed: Dec. 3, 2015

(86) PCT No.: PCT/KR2015/013145
§ 371 (c)(1),
(2) Date: Jun. 2, 2017

(87) PCT Pub. No.: WO2016/089129
PCT Pub. Date: Jun. 9, 2016

(65) Prior Publication Data
US 2018/0263056 A1 Sep. 13, 2018

(30) Foreign Application Priority Data
Dec. 3, 2014 (KR) .................. 10-2014-0172295

(51) Int. Cl.
*H04W 74/08* (2009.01)
*H04L 27/00* (2006.01)
(Continued)

(52) U.S. Cl.
CPC ......... *H04W 74/0816* (2013.01); *H04L 5/005* (2013.01); *H04L 27/0006* (2013.01);
(Continued)

(58) Field of Classification Search
CPC ................ H04W 74/0816; H04W 74/089
See application file for complete search history.

(56) References Cited

U.S. PATENT DOCUMENTS

| | | |
|---|---|---|
| 2006/0153150 A1 | 7/2006 | Yang et al. |
| 2009/0232095 A1 | 9/2009 | Ahn et al. |

(Continued)

FOREIGN PATENT DOCUMENTS

| | | |
|---|---|---|
| KR | 20090094743 A | 9/2009 |
| KR | 20110052816 A | 5/2011 |

(Continued)

OTHER PUBLICATIONS

Foreign Communication From a Related Counterpart Application, PCT Application No. PCT/KR2015/013145, International Search Report dated Mar. 4, 2016, 3 pages.

(Continued)

*Primary Examiner* — Hoon J Chung

(57) ABSTRACT

The present disclosure relates to a communication technique for converging IoT technology with a 5G communication system for supporting a higher data transmission rate after a 4G system and, and a system therefor. The present disclosure can be applied to intelligent services on the basis of 5G communication technology and IoT-related technology (for example, smart homes, smart buildings, smart cities, smart cars or connected cars, healthcare, digital education, retail business, security and safety-related service, etc.). When a particular frequency at which an LTE-A system operates is included in an unlicensed band, a situation may occur where some subframes of the LTE-A system cannot be used. When (Continued)

a synchronization signal and a discovery reference signal to be transmitted by a base station collide with a detection and channel occupation operation for the unlicensed band, the timing of the detection and channel occupation operation for the unlicensed band may be adjusted in order to solve the problem of the collision.

12 Claims, 18 Drawing Sheets

(51) Int. Cl.
  *H04L 5/00* (2006.01)
  *H04W 74/00* (2009.01)
  *H04W 16/14* (2009.01)

(52) U.S. Cl.
  CPC ..... *H04W 74/008* (2013.01); *H04W 74/0808* (2013.01); *H04W 74/0891* (2013.01); *H04L 5/0023* (2013.01); *H04W 16/14* (2013.01)

(56) References Cited

U.S. PATENT DOCUMENTS

| | | | |
|---|---|---|---|
| 2011/0117945 | A1 | 5/2011 | Kim et al. |
| 2013/0201975 | A1 | 8/2013 | Chen et al. |
| 2014/0247808 | A1 | 9/2014 | Zhang et al. |
| 2015/0373652 | A1* | 12/2015 | Dabeer ............... H04W 52/246 455/522 |
| 2016/0007353 | A1* | 1/2016 | Malladi ................ H04L 5/0053 370/329 |
| 2016/0037443 | A1 | 2/2016 | Kim et al. |
| 2016/0135189 | A1* | 5/2016 | Chandrasekhar ............................ H04W 72/0446 370/336 |
| 2018/0279211 | A1* | 9/2018 | Lunttila ................ H04W 48/16 |

FOREIGN PATENT DOCUMENTS

| | | |
|---|---|---|
| KR | 20140094565 A | 7/2014 |
| WO | 2014142526 A | 9/2014 |

OTHER PUBLICATIONS

Foreign Communication From a Related Counterpart Application, PCT Application No. PCT/KR2015/013145, Written Opinion dated Mar. 4, 2016, 6 pages.

* cited by examiner

METHOD AND APPARATUS FOR DETECTING CHANNEL IN MOBILE COMMUNICATION SYSTEM OPERATING IN UNLICENSED BAND

CROSS-REFERENCE TO RELATED APPLICATION(S)

The present application claims priority under 35 U.S.C. § 365 to International Patent Application No. PCT/KR2015/013145 filed Dec. 3, 2015, entitled "METHOD AND APPARATUS FOR DETECTING CHANNEL IN MOBILE COMMUNICATION SYSTEM OPERATING IN UNLICENSED BAND", and, through International Patent Application No. PCT/KR2015/013145, to Korean Patent Application No10-2014-0172295 filed Dec. 14, 2014, each of which are incorporated herein by reference into the present disclosure as if fully set forth herein.

TECHNICAL FIELD

The present invention relates to transmission devices using unlicensed bands, and more particularly, to a method and apparatus for detecting channels to use an unlicensed band.

BACKGROUND ART

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, Device to Device communication (D2D), wireless backhaul, moving network, cooperative communication, Coordinated Multi-Points (COMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information, to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information, to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

To this end, various attempts have been made to apply 5G communication systems to the IoT. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

Existing 3rd Generation Partnership Project Long Term Evolution (3GPP LTE) systems and existing Long Term Evolution Advanced (LTE-A) systems were designed, assuming that the systems operate in frequency bands included in licensed bands; however, LTE-A systems may also be altered to operate in unlicensed bands in order to increase the whole capacity of system. If a specific frequency where LTE-A systems operate is included in an unlicensed band, the transmission of other wireless transmission devices sharing the unlicensed band or use regulatory particulars for the unlicensed band may cause a condition where part of the subframes of an LTE-A system cannot be used.

DISCLOSURE OF INVENTION

Technical Problem

Since an available frequency is increased by using an unlicensed band in an LTE system and a specific UE is set to receive a data service in an unlicensed band, a discovery reference signal (DRS), a synchronization signal, etc. cannot be transmitted periodically, by interference due to other devices other than LTE-A systems or frequency regulatory particulars. Therefore, methods are needed to resolve the problem.

Solution to Problem

The present invention has been made to address the above problems and disadvantages, and to provide at least the advantages described below. In accordance with an aspect of the present invention, a method of performing the channel detection and the channel reservation in a base station using an unlicensed band is provided. The method includes: determining whether an interval where the channel detection and the channel reservation are performed conflicts with a subframe transmitting a primary synchronization signal (PSS) and a secondary synchronization signal (SSS) or an interval where a discovery reference signal (DRS) is transmitted; and determining a subframe to perform the following channel detection and channel reservation if an interval where the channel detection and the channel reservation are performed conflicts with a subframe transmitting a PSS and an SSS or an interval where a DRS is transmitted.

In accordance with another aspect of the present invention, a method for a terminal using an unlicensed band to use a channel is provided. The method includes: using a channel during a first time less than a maximum channel use time; and using a channel during a maximum channel time after the first subframe.

In accordance with another aspect of the present invention, a base station using an unlicensed band, performing channel detection and channel reservation, is provided. The base station includes: a transceiver for performing the transmission/reception of signals; and a controller for: determining whether an interval where the channel detection and the channel reservation are performed conflicts with a subframe transmitting a primary synchronization signal (PSS) and a secondary synchronization signal (SSS) or an interval where a discovery reference signal (DRS) is transmitted; and determining a subframe to perform the following channel detection and channel reservation if an interval where the channel detection and the channel reservation are performed conflicts with a subframe transmitting a PSS and an SSS or an interval where a DRS is transmitted.

In accordance with another aspect of the present invention, a terminal using an unlicensed band, using a channel, is provided. The terminal includes: a transceiver for performing the transmission/reception of signals; and a controller for using: a channel during a first time less than a maximum channel use time; and a channel during a maximum channel time after the first subframe.

Advantageous Effects of Invention

The method of altering the timings of the channel detection and channel reservation, according to embodiments of the present invention, does not cause the collision among the transmission of PSS and SSS or the transmission of DRS and the channel detection and channel reservation in an eNB.

MODE FOR THE INVENTION

Figure 1:
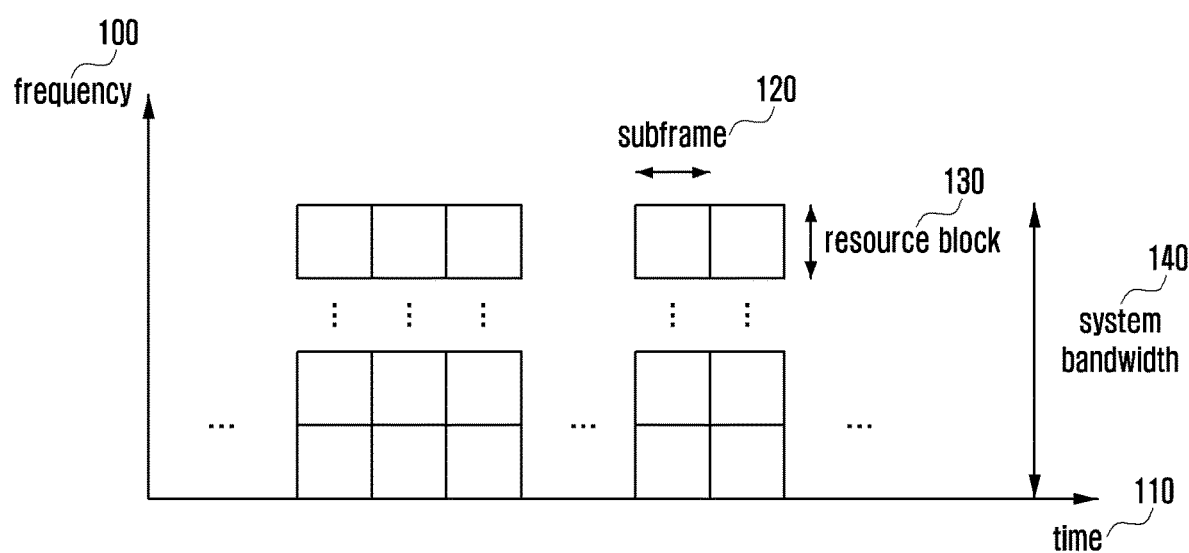
FIG. 1 is a diagram showing time and frequency resources in an LTE/LTE-A system.

Hereinafter, embodiments of the invention are described in detail with reference to the accompanying drawings. Detailed descriptions of well-known functions and structures incorporated herein are omitted to avoid obscuring the subject matter of the invention. The following terms are defined considering functions of the invention, and may be changed by users or operators according to their needs. Therefore, the terms will be defined throughout the content of this description.

In the following description, the embodiments of the present invention will be described based on OFDM-based wireless communication systems, in particular, 3GPP Evolved Universal Terrestrial Radio Access (E-UTRA) standard; however, it will be appreciated to those skilled in the art that the subject matter of the present invention can also be applied to various types of communication systems which have the technical background and channel forms similar to those of the present invention, without departing from the scope and spirit of the present invention.

The features and advantages of the invention and the methods to accomplish the objectives of the invention will become more apparent from the following detailed description and the accompanying drawings. The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims. In the following description with reference to the accompanying drawings, the same elements are denoted by the same reference numbers.

Mobile communication systems that were providing voice-based services have evolved to wireless packet data communication systems that are capable of providing high quality and high speed data services and multimedia services. In recent years, various mobile communication standards, such as: High Speed Downlink Packet Access (HSDPA), High Speed Uplink Packet Access (HSUPA), Long Term Evolution (LTE), Long Term Evolution Advanced (LTE-A) of 3GPP; High Rate Packet Data (HRPD) of 3rd Generation Partnership Project 2 (3GPP2); 802.16 of Institute of Electrical and Electronics Engineers (IEEE); etc., have been developed to support a wireless packet data transmission service on high quality and high speed. In particular, LTE systems have been developed to efficiently support the high speed transmission of radio packet data and maximize the capacity of radio system using various radio access technologies. LTE-A systems are referred to as advanced radio system advanced from LTE systems and have advanced data transmission capability, compared with LTE.

In general, LTE is referred to as an eNB and UE corresponding to Release 8 or 9 of the 3GPP standard group, and LTE-A is referred to as an eNB and UE corresponding to Release 10 or 9 of the 3GPP standard group. The 3GPP standard group has standardized LTE-A systems and is working on standardization of the following release with advanced performance, based on the standardized LTE-A system.

Existing $3^{rd}$ and $4^{th}$ generation wireless packet data communication systems, such as, HSDPA, HSUPA, HRPD, LTE/LTE-A, etc., use technologies, such as Adaptive Modulation and Coding (AMC), channel sensitive scheduling, etc. in order to improve transmission efficiency. The AMC method enables a transmitter to control an amount of data to be transmitted according to the channel quality. That is, the transmitter is capable of reducing, if the channel quality is relatively low, the amount of data to be transmitted and meets the error probability of reception to a corresponding level, and increasing, if the channel quality is relatively high, the amount of data to be transmitted and meets the error probability of reception to a corresponding level, thereby effectively transmitting relatively large amount of information. The channel sensitive scheduling resource management method enables a transmitter to selectively service a user whose channel quality is relatively high among a number of users, and thus increase the capacity of system, compared with a case that a channel is allocated to one user and services are provided to the user. As such, the capacity increase is called a Multi-user Diversity gain. In short, the AMC method and the channel sensitive scheduling method are referred to as methods that enable a transmitter to be fed back part of channel quality information from a receiver and apply an adaptive modulation and coding technique at the most efficient timing.

If the AMC method is used along with the Multiple Input Multiple Output (MIMO) transmission, it may also include a function for determining a rand or the number of spatial layers of signals to be transmitted. In this case, the AMC method determines an optimal data rate, considering the number of layers for transmission using MIMO as well as a coding rate and a modulation method.

MIMO transmitting radio signals using a number of transmission antennas is classified into Single User MIMO (SU-MIMO) transmitting radio signals to one UE and Multi-User MIMO (MU-MIMO) transmitting radio signals to a number of UEs using the same time and frequency resources. SU-MIMO enables a number of transmission antennas to transmit radio signals to one receiver with a number of spatial layers. In this case, the receiver needs to have a number of reception antennas to support a number of spatial layers. On the other hand, MU-MIMO enables a number of transmission antennas to transmit radio signals to a number of receivers with a number of spatial layers. MU-MIMO is advantageous because the receiver does not need to have a number of reception antennas, compared with SU-MIMO. On the other hand, since MU-MIMO transmits radio signals to a number of receivers using the same frequency and time resources, this may cause interference between radio signals for the receivers, which is disadvantageous.

In recent years, researches have been made to replace Code Division Multiple Access (CDMA) as multiple access used in 2G and 3G mobile communication systems with Orthogonal Frequency Division Multiple Access (OFDMA) in the next generation system. 3GPP and 3GPP2 have started to work on standardization of advanced systems using OFDMA. It has been known that OFDMA mode may increase the capacity, compared with CDMA mode. One of the reasons that OFDMA mode can bring capacity increase is to perform Frequency Domain Scheduling. Like the channel sensitive scheduling method that obtains a capacity gain based on a characteristic that channel varies as time elapses, the OFDMA mode may obtain a larger capacity gain using a characteristic that channel varies depending on frequency.

FIG. 1 is a diagram showing time and frequency resources in an LTE/LTE-A system.

As shown in 1, wireless resources that an eNB transmits to UE are divided into resources in a unit of resource block (RB) on the frequency domain 100 and resources in a unit of subframe on the time domain 110. An RB is divided into 12 subcarriers in an LTE/LTE-A system and has a band of 180 kHz. On the other hand, a subframe is configured to include 14 OFDM symbol intervals in an LTE/LTE-A system, and has a time interval of 1 ms. An LTE/LTE-A system is capable of performing the scheduling to allocate resources in a unit of subframe on the time domain and in a unit of resource block on the frequency domain.

Figure 2:
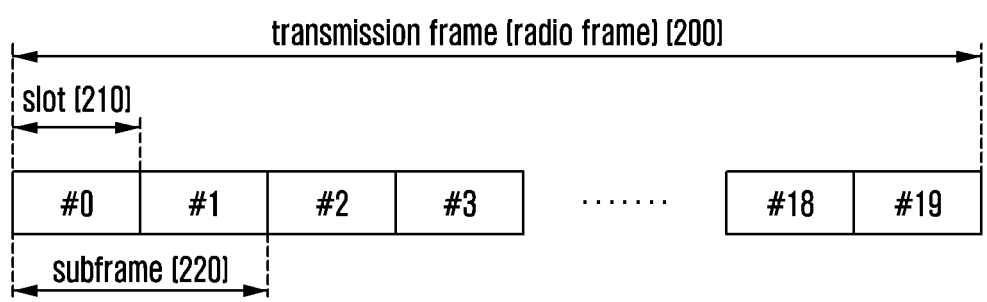
FIG. 2 is a detailed diagram showing the structure of a transmission frame of an LTE-A system in frequency division duplex (FDD) mode.

FIG. 2 is a detailed diagram showing the structure of a transmission frame of an LTE-A system in frequency division duplex (FDD) mode.

With reference to FIG. 2, one transmission frame (radio frame) 200 is configured to include 10 subframes 220 each of which is configured to include two slots 210. In a frame, each subframe has indexes #0 to #9 and each slot has indexes (or numbers) from #0 to #19.

In the radio frame shown in FIG. 2, the last OFDM symbols of slot 0 to slot 10 transmit a primary synchronization signal (PSS), and the second last OFDM symbols of slot #0 to slot #10 transmit a secondary synchronization signal (SSS). That is, UE detects PSS and SSS transmitted via slot #0 and slot #10, identifies slot number of UE, obtains a time/frequency synchronization of a system, and performs the transmission/reception of pilots, control signals and data.

Figure 3:
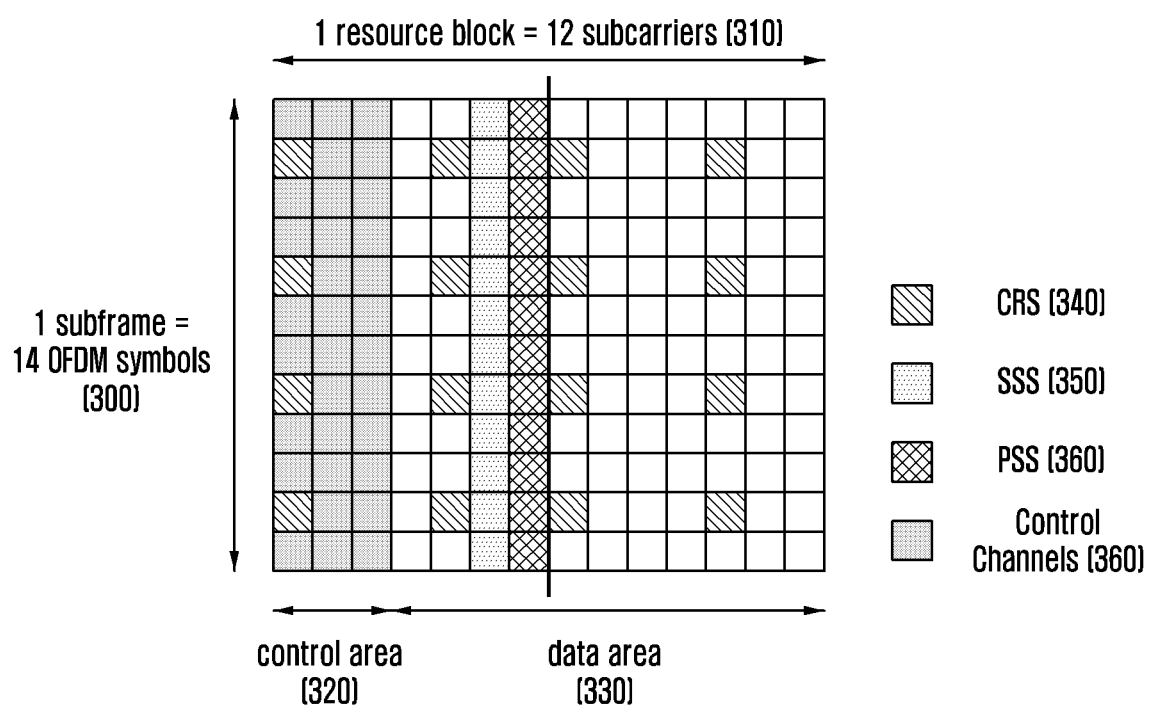
FIG. 3 is a detailed diagram showing the structure of subframe #0 and subframe #5.

FIG. 3 is a detailed diagram showing the structure of subframe #0 and subframe #5.

FIG. 3 shows 1 a wireless resource of 1 subframe 310 and 1 resource block 300 as a minimum unit that an LTE/LTE-A system performs the downlink scheduling for subframe #0 and subframe #5. The wireless resource is configured to include 12 subcarriers in a frequency area and 14 OFDM symbols in a time area, thereby having a total of 168 unique frequency and time locations. In LTE/LTE-A, each of the unique frequency and time locations is referred to as resource element (RE). One subframe is configured to include two slots each of which has 7 OFDM symbols.

The wireless resource shown in FIG. 3 is capable of transmitting a number of signals that differ in type from each other as follows.

cell specific reference signal (CRS) 340: a reference signal transmitted for all of the UEs that belong to one cell

PSS 360

SSS 350 control channel 370: a resource that provides control information that UE need to receive data or is needed to perform the transmission of an acknowledgement/negative acknowledgement (ACK/NACK) for operating a Hybrid automatic repeat request (HARQ) in response to the uplink transmission of data, and takes 1 to 3 OFDM symbol areas.

Other resources: a corresponding resource may transmit data 330 to be transmitted to UE, a demodulation reference signal (DM RS) used to decode data, or a channel state information reference signal (CSI-RS) used to estimate a channel, etc.

Figure 4:
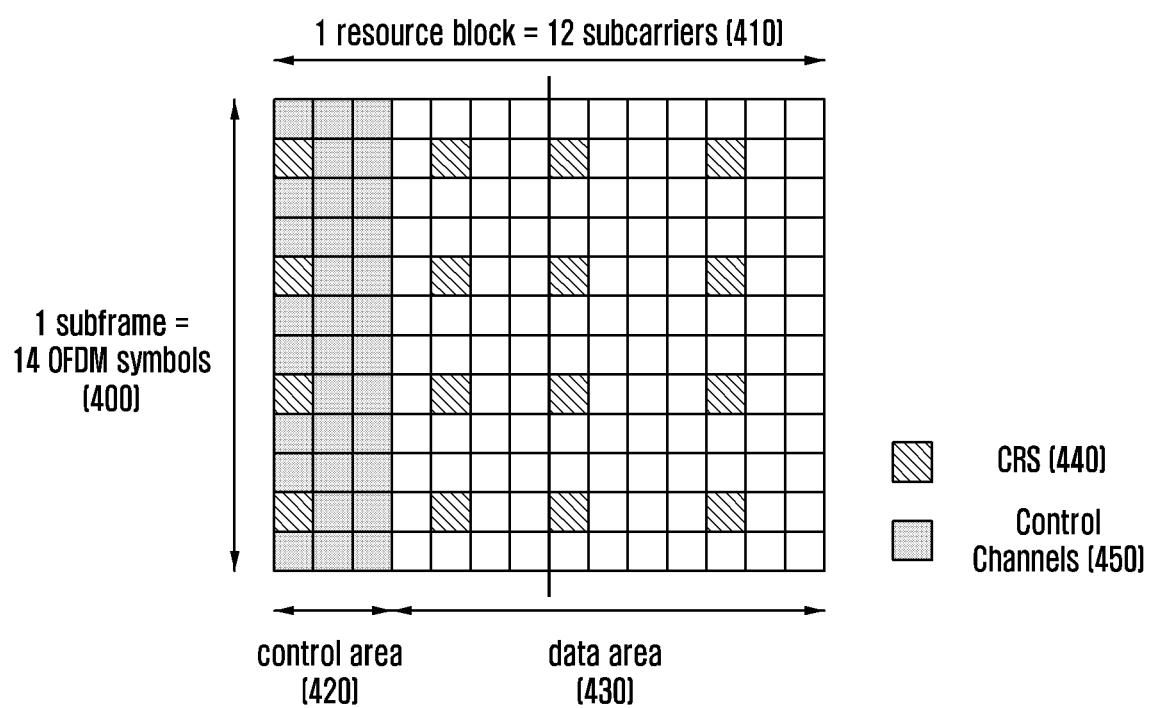
FIG. 4 is a detailed diagram showing the structure of a subframe which is not subframe #0 and subframe #5.

FIG. 4 is a detailed diagram showing the structure of a subframe which is not subframe #0 and subframe #5.

subframe #0 and subframe #5 transmit PSS and SSS; however, the other subframes does not transmit PSS and SSS, but replaces a corresponding area with the other resources transmitting control channel 420, data 430 and reference signals.

A cellular system needs to transmit a reference signal to measure a downlink channel state. In an LTE-A system of 3GPP, UE measures its channel state between the UE and an eNB, using CRS or CSI-RS transmitted by the eNB. The CRS is transmitted every subframe. The CSI-RS is transmitted at a period of 5 ms, 10 ms, 20 ms, 40 ms, or 80 ms. The eNB selects a correct period of CSI-RS from the values described above and sets the selected value for UE.

In an LTE-A system considering the mobility of UE, UE measures CRS or CSI-RS of its connected eNB and its nearby eNBs, calculates downlink reception power, and reports the calculated result to the eNB. That is, if UE measures reception power from CRS or CSI-RS of its connected eNB and its nearby eNBs, and reports the measured reception power to it connected eNB, the eNB performs the comparison of the reception power values reported from the UE, determines whether it maintains the connection with the UE or hands over the UE to a neighboring eNB, and performs a corresponding operation based on the determination, thereby allowing the UE to connect to the network while the UE is moving.

In order to enable UE to measure and report reception power from a number of eNBs, LTE-A employs the concept of a discovery reference signal (DRS) and the DRS measurement timing configuration (DMTC). DRS is referred to as a set of signals that enables a specific UE to measure downlink reception power of a specific eNB, and includes: PSS, SSS and CRS of a corresponding specific eNB; or PSS, SSS, CRS and CSI-RS. DMTC is referred to as an interval in which UE measures DRS from one or more eNBs. One DMTC is created with a period of 40 ms, 80 ms, or 160 ms and a specific subframe offset value. One DMTC has a length of 6 ms. From the point of view of a specific UE, a period for DMTC and the subframe offset value are set to the UE by an eNB. The length of DRS interval in one DMTC is set to one value between 1 ms and 5 ms. In a DRS interval, the first OFDM symbol includes SSS, all the OFDM symbols include CRS, and one OFDM symbol includes CSI-RS.

If UE detects a location of DRS, the UE: recognizes the time/frequency synchronization of an eNB measuring DRS, via PSS and SSS existing at a corresponding location; measures downlink reception power of CRS and CSI-RS, adapting to a corresponding synchronization; and reports a corresponding value to its connected eNB.

Figure 5:
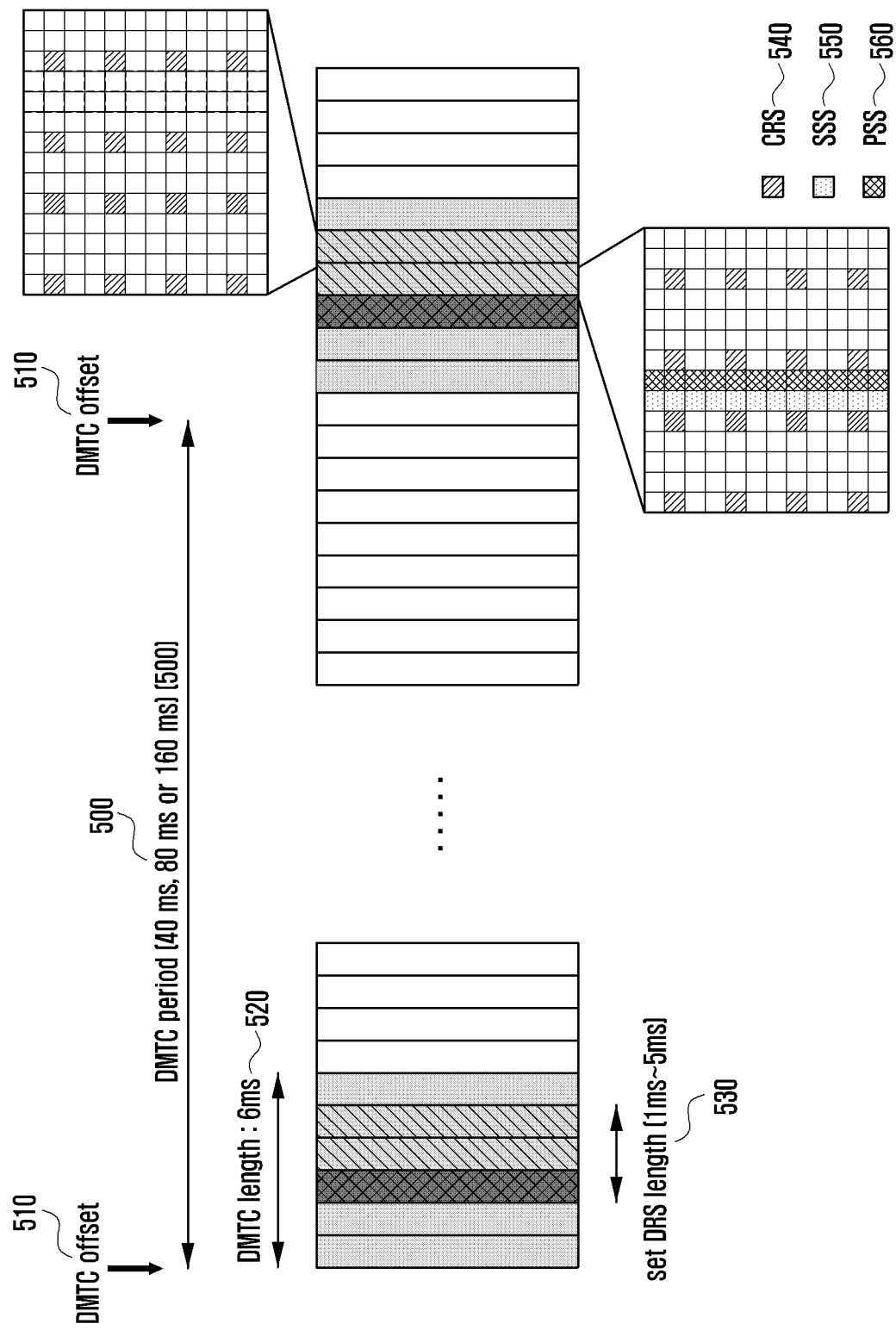
FIG. 5 is a detailed diagram showing the structure of DRS and DMTC.

FIG. 5 is a detailed diagram showing the structure of DRS and DMTC.

With reference to FIG. 5, UE is set with a period 500 where DMTC is generated and an offset value 510, and identifies a timing to measure DRS. The period 500 where DMTC is generated corresponds to 40 ms, 80 ms, or 160 ms. In this case, an offset value for the set period N corresponds to one of 0 to N−1. UE set with a period of DMTC and an offset value is capable of ascertaining that a DMTC is set for 6 ms from a corresponding location. It is assumed that the time setting assumed by UE follows the time synchronization of an eNB to which all corresponding UE connects. After that, UE detects a DRS length 530 in the DMTC. A specific DRS length may be set to one of the values from 1 ms to 5 ms. In the embodiment shown in FIG. 5, it is assumed that the DRS length is 3 ms. DRS in the DMTC of 6 ms may be located at any time interval in which the length is guaranteed; however, SSS needs to be included in the first subframe of DRS. Therefore, from the point of view of a specific eNB, it is natural to locate the first subframe of DRS transmitted by a corresponding eNB at subframe #0 or subframe #5 within the radio frame. On the other hand, from the point of view of UE, since UE needs to measure DRS of eNBs that can have different synchronizations, it is not assumed that all of DRSs are located at subframe #0 or subframe #5 for eNB to which the UE connected to.

If UE identifies a location of DRS as shown in FIG. 5, the UE: identifies time/frequency synchronization measuring a corresponding DRS, via PSS 560 and SSS 550 in the first OFDM symbol of DRS; measures downlink reception power of CSI-RS and CRS 540 within a time interval of 3 ms, adapting to a corresponding synchronization; and reports a corresponding value to its connected eNB.

The process of setting a period/offset for DMTC in an LTE-A system and transmitting DRS and the process of measuring and reporting DRS by UE are designed, assuming that an LTE-A system is serviced in an licensed band. That is, it is designed assuming that, if an LTE-A system is used for a specific frequency area, a corresponding frequency area is included in a licensed band used only by an LTE-A system and thus services only LTE-A, but does not create an interference which cannot be estimated from the other systems. Therefore, if eNBs set DRS with a specific period and performs the transmission in an existing LTE-A system, an eNB and UE are capable of transmitting/receiving DRS to/from each other, without error, at the set period, for a certain interval, in a corresponding network.

However, a method may be considered that enables an LTE-A system to be used free of charge by anybody or to operate in an unlicensed band as a frequency band where the LTE-A system can use along with other transmission devices so as to secure an additional frequency and thus increase the total capacity of system.

Figure 6:
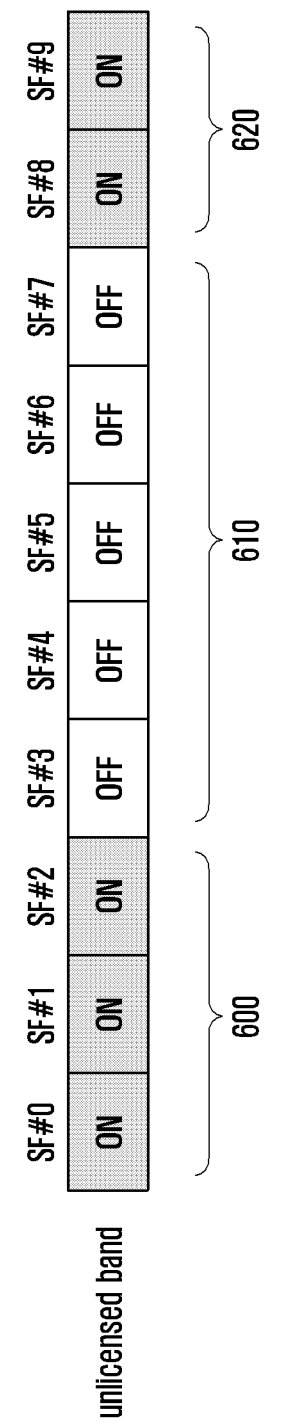
FIG. 6 is a diagram showing a wireless communication resource used by an LTE-A system in unlicensed band.

FIG. 6 is a diagram showing a wireless communication resource used by an LTE-A system in unlicensed band.

With reference to FIG. 6, if a specific frequency in which an LTE-A system operates is included in an unlicensed band and an LTE-A system performs its operation, the LTE-A system uses subframe #0 to #2 (600) and subframe #8 to subframe #9 (620); however, a situation may occur where part of subframes of LTE-A, such as subframe #3 to subframe #7 (610), cannot be used by the transmission of a wireless communication device using Wi-Fi that shares an unlicensed band or the other wireless communication devices or by use regulatory particulars for an unlicensed band. Corresponding subframes that cannot be used may be locations to which a DRS or synchronization signal and an important signal such as system information are need to be transmitted.

As described above, the LTE-A system has been designed, assuming that the system operates only in a licensed band; however, operations of eNB and UE may be considered that enable a system to operate with a partial use frequency in an unlicensed band to secure an additional frequency, thereby increasing the total capacity of LTE-A systems. Therefore, if an LTE-A system uses an unlicensed band, and if existing signals designed to periodically transmitted, such as a discovery reference signal (DRS), a synchronization signal, etc., are not transmitted periodically, by interference due to other wireless communication devices, which is caused because a specific UE is set to receive a data service in an unlicensed band, and frequency regulatory particulars, the present invention provides a channel detection and signal transmission method for an eNB to maximally use the condition.

The following Table 1 describes Listen-before-talk (LBT) international regulatory particulars that signal transmission devices share an unlicensed band and need to satisfy. In the ETSI international regulations, devices need to perform N times channel detections in a minimum unit of 20 μs before performing the transmission, and each device may perform the transmission only if it ascertains that a channel is not currently used as energy, detected in a corresponding unlicensed channel for all the channel detection of N times, is less than or equal to a preset value. In addition, a corresponding device needs to perform only the channel detection, without using the channel, in a channel detection interval of N times. A unit of execution for the channel detection is called clear channel assessment (CCA), and CCA execution of N times is called extended CCA (ECCA). A detailed description refers to the ETSI regulations.

TABLE 1

| Function | Requirements |
|---|---|
| Minimum CCA time | 20 μs |
| ECCA time | CCA execution time of N times. N is an integer from 1 to q, and randomly selected each time. q is an integer between 4 to 32 and is fixedly set and used according to device. |
| Maximum channel use time | (13/32) × q ms |
| Idle time | ECCA time interval |
| CCA energy detection limit | −73 (dBm/MHz) + 12 (dBm) − pathloss (dBm) |

A Transmission device satisfying the regulatory requirements described in table 1 performs the following operations for a specific q value:

A device operating in an unlicensed band performs ECCA for a minimum N×20 μs before the transmission.

A corresponding device stops the transmission so as not to use a channel for an ECCA interval.

When a specific ECCA starts, an N value is randomly determined between 1 and q and stored in the counter.

If the device ascertains that a channel is not used every CCA execution in a specific ECCA interval, the device decrease the value stored the counter by one.

If the value stored in the counter is zero '0', a corresponding device reserves a channel and performs the transmission.

Time that a specific device can use channel maximally once is (13132)×q ms (where q is an integer between 4 and 32). The device needs to perform ECCA again after a corresponding maximum use time.

Figure 7:
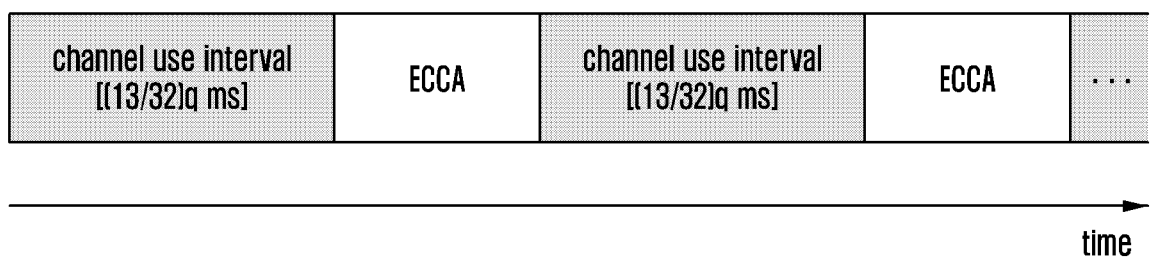
FIG. 7 is a diagram showing a channel use time and an ECCE time (idle time) of a transmission device operating in an unlicensed band.

FIG. 7 is a diagram showing a channel use time and an ECCE time (idle time) of a transmission device operating in an unlicensed band.

With reference to FIG. 7, if a transmission device operating in an unlicensed band uses channels for a time interval of a maximum (13/32)×q ms, the transmission device needs to create a randomly determined N again and then perform a new ECCA. Each ECCA time varies in length depending on an N value newly created each time and according to the channel use of other transmission devices.

Therefore, unlike an LTE-A system assuming operations in an existing licensed band, if an LTE-A system needs to operate in an unlicensed band, satisfying regulatory requirements, a maximum transmission time determined by a q value needs to be defined and a non-transmission interval also needs to be defined in which a system stops the transmission after a specific maximum transmission time and performs the ECCA operation. As described above, since an existing LTE-A system is implemented in such a way that data transmission is generated in subframe unit and a minimum time unit controlling the transmission is identical to an OFDM symbol interval, in order to enable an LTE-A system to operate in an unlicensed band via at least implement alteration, the non-transmission interval and the maximum transmission time need to be designed so as to be adapted to an OFDM symbol interval and a subframe time interval of the current LTE-A. In the following description, an LTE-A system designed to operate in an unlicensed band is called an LTE unlicensed (LTE-U) system.

A radio frame of an existing LTE-A system is defined as it includes 10 subframes and one subframe time interval is 1 ms. Therefore, if q is set to 23 or 24, time that transmission devices may use channels maximally in an unlicensed band according to regulatory requirements are 9.34375 ms and 9.75 ms, respectively. An LTE-U system that sets q to 23 or 24 may be designed to form a radio frame of a total of 10 ms in such a way as to: transmit only 9 subframes maximally to reserve a channel for 9 ms; and perform operations including an ECCA operation, related to only an unlicensed band, for the remaining 1 ms. Alternatively, if q is set to 11 or 12, times that transmission devices may use channels maximally in an unlicensed band according to regulatory requirements are 4.46875 ms and 4.875 ms, respectively. An LTE-U system that sets Q to 11 or 12 may be designed to form a radio frame of a total of 10 ms in such a way that: only 4 subframes are transmitted maximally to reserve a channel for 4 ms and operations including an ECCA operation, related to only an unlicensed band, are performed for the remaining 1 ms; and this design is repeated twice.

Figure 8A:
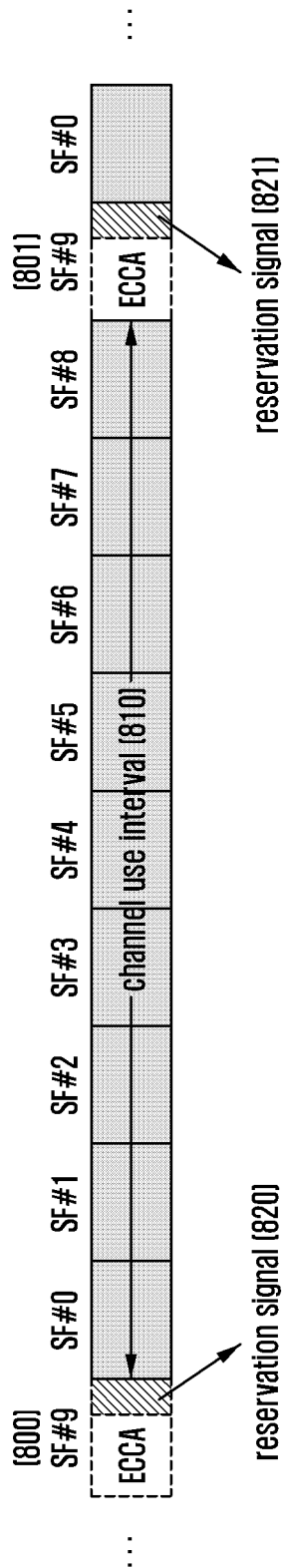
FIG. 8A is a diagram showing the frame structure of an LTE-U system designed in such a way as to set q to 23 or 24 and use 9 subframes as a maximum channel use interval.

FIG. 8A is a diagram showing the frame structure of an LTE-U system designed in such a way as to set q to 23 or 24 and use 9 subframes as a maximum channel use interval.

FIG. 8A is an example assuming that an interval, in which interference with transmission devices of another unlicensed band, operating near a specific LTE-U eNB, is created, is small or does not exists, and thus ECCA operation is 1 ms or less. If an LTE-U eNB performs an ECCA operation in subframe #9 (800) and is then in a state where the LTE-U eNB can use a channel, in order to immediately reserve a channel, the LTE-U eNB transmits a reservation signal 820, and then transmits, if a timing of subframe #0 arrives, RS, control channel, data channel, etc., using the same physical layer structure as an existing LTE-A, during the following 9 subframes, in a channel use interval 810. After that, the LTE-U eNB stops the transmission according to the regulatory particulars, and may repeat operations, such as the ECCA operation, etc., in subframe #9 (801).

Figure 8B:
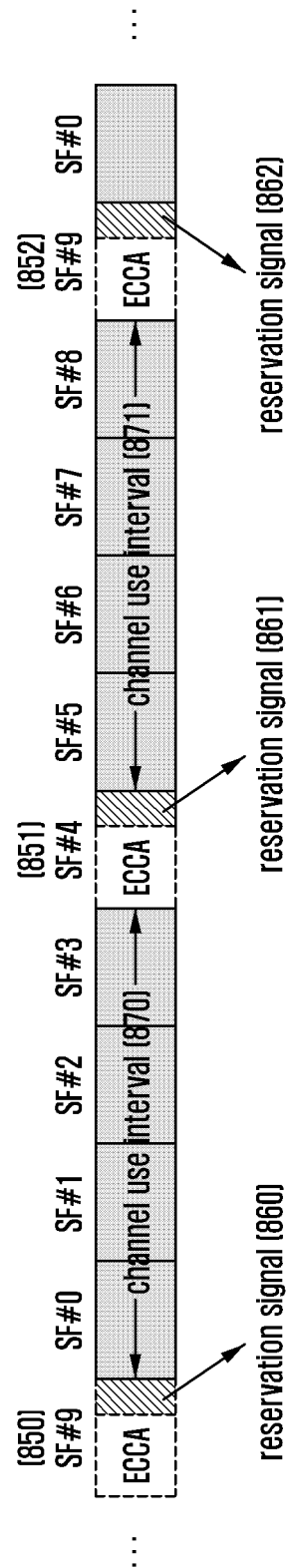
FIG. 8B is a diagram showing the frame structure of an LTE-U system designed in such a way as to set q to 11 or 12 and use 4 subframes as a maximum channel use interval.

FIG. 8B is a diagram showing the frame structure of an LTE-U system designed in such a way as to set q to 11 or 12 and use 4 subframes as a maximum channel use interval.

If an LTE-U eNB performs an ECCA operation in subframe #9 (850) and is then in a state where the LTE-U eNB can use a channel, in order to immediately reserve a channel, the LTE-U eNB transmits a reservation signal 860, and then transmits, if a timing of subframe #0 arrives, RS, control channel, data channel, etc., using the same physical layer structure as an existing LTE-A, during the following 4 subframes, in a channel use interval 870. After that, the LTE-U eNB: stops the transmission according to the regulatory particulars; performs an ECCA operation again in subframe #4 (801); transmits a reservation signal 861; and transmits, if a timing of subframe #5 arrives, RS, control channel, data channel, etc., during the following 4 subframes, in a channel use interval 871. After that, the LTE-U eNB may repeat the operations.

If an LTE-U performs an ECCA as described above referring to FIG. 8A or 8B, the interval length of the ECCA may be set to a length corresponding to the minimum number of OFDM symbols set to be greater than a minimum ECC time described above in the ECCA process. In addition, the reservation signal, shown in FIG. 8, may be, in type, part or all of the physical layer signal defined in the existing LTE-A or a signal separately designed for the channel reservation of an LTE-U.

FIGS. 8A and 8B are diagrams of the radio frame structure of an LTE-U assuming that LTE-U performs ECCA and channel reservation operations in one subframe and can satisfy regulatory requirements of the unlicensed band. However, since a wireless communication device, using Wi-Fi that shares a channel with a specific LTE-U eNB in an unlicensed band, or the other wireless communication devices exist, an ECCA and channel reservation interval may take one or more subframes.

Figure 9:
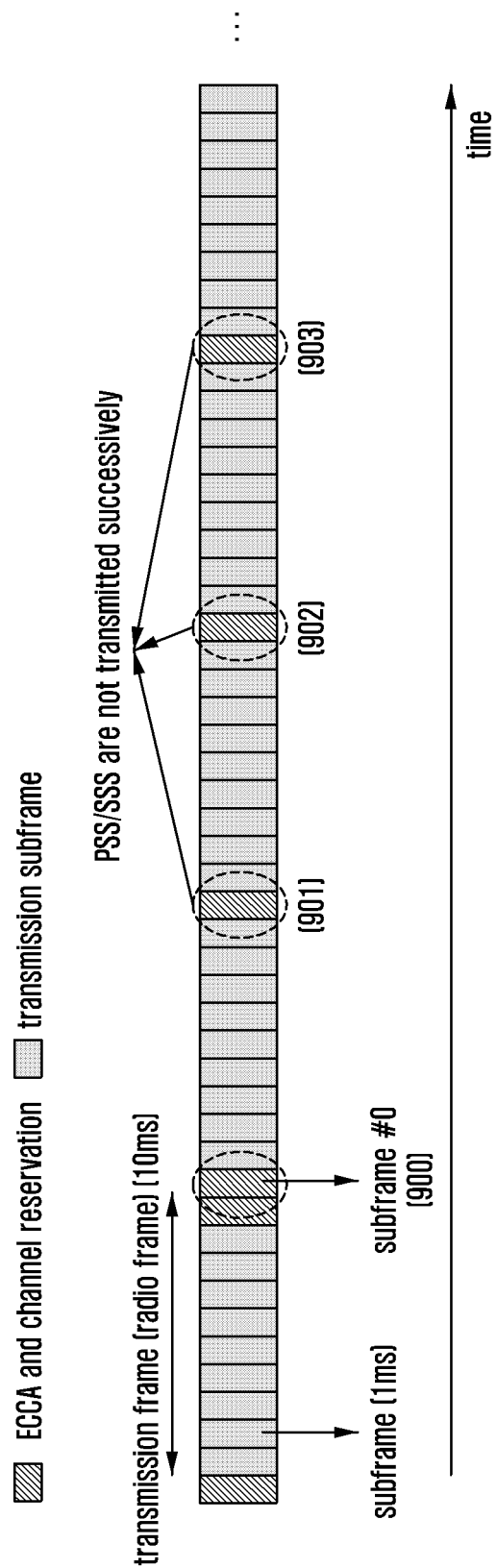
FIG. 9 is a diagram that describes a state where an LTE-U eNB performs the transmission and the channel detection.

FIG. 9 is a diagram that describes a state where an LTE-U eNB performs the transmission and the channel detection.

With reference to FIG. 9, an eNB performs ECCA and channel reservation operations in subframe #9 (910) at the initial transmission as in a state shown in FIG. 8A, and then performs the transmission as an LTE-A from subframe #0 to #8. However, there may be a case where a transmission of another device is generated in a specific ECCA interval, and thus the eNB needs to continue performing an ECCA in subframe #0 (900) according to the regulatory particulars. Since the situation occurred, if the eNB uses 9 subframes for the LTE system transmission and performs ECCA and channel reservation operations in the following one subframe, according to the transmission method of an LTE-U described above, intervals where the ECCA and channel reservation operations are performed are successively generated at subframe #0 (901, 902 and 903). In this case, PSS and SSS included in subframe #0 cannot be successively transmitted, and this causes UEs connecting to a corresponding LTE-U eNB to have difficulty in obtaining synchronization. Like the case shown in FIG. 8B, this problem may also occur in a case where an eNB performs ECCA and channel reservation operations in subframe #0 and #5 when 4 subframes are used for the signal transmission according to the LTE system.

A situation where the execution of ECCA and channel reservation operations in subframe #0 (900) of FIG. 9 conflicts with the transmission of PSS and SSS is not avoidable because the situation is caused by restricting unlicensed bands. However, after that, a situation where subframe #0 is successively used to perform the ECCA and channel reservation operations can be avoided as the eNB adjusts an ECCA timing and a transmission timing. In the following description, a method for an eNB to adjust ECCA and transmission timings is explained in detail.

Figure 10:
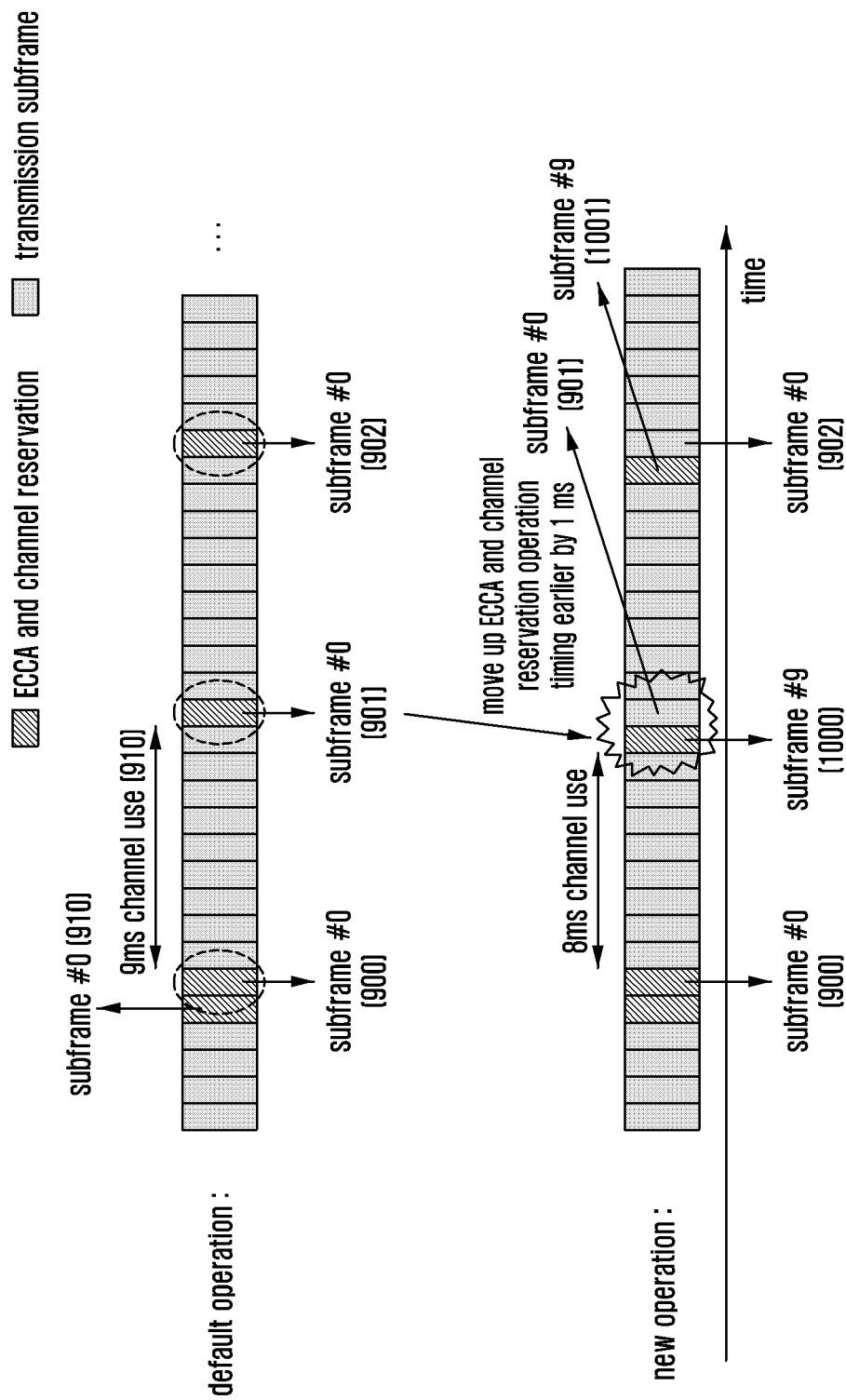
FIG. 10 is a diagram showing a first embodiment for protecting important signals, such as PSS, SSS, etc., resolving the problem in the embodiment shown in FIG. 9.

FIG. 10 is a diagram showing a first embodiment for protecting important signals, such as PSS, SSS, etc., resolving the problem in the embodiment shown in FIG. 9.

The method according to the embodiment shown in FIG. 10 is to move up an ECCA timing to before a subframe transmitting a corresponding important signal. Although a corresponding LTE-U eNB has 1 ms or more as an available maximum channel use time, the LTE-U eNB previously performs ECCA and channel reservation operations in subframe #9 (1000), so that the corresponding LTE-U eNB can operate without violating the regulations and avoid a situation where the ECCA and channel reservation operations continuously conflict with the transmission of PSS and SSS. That is, unlike a process where a given maximum channel use time is always maximally used as shown in FIG. 9, if the LTE-U eNB performs a new operation as shown in FIG. 10, the transmission operation of PSS and SSS in subframe #0 (902) can be naturally protected.

That is, in a new operation of FIG. 10, if the LTE-U eNB ascertains that the last subframe #0 (900) of a specific ECCA and channel reservation interval conflicts with a subframe transmitting PSS and SSS, the LTE-U eNB does not perform the transmission using all of the given maximum channel use times after the corresponding specific ECCA and channel reservation interval, but stops the transmission earlier by a certain time (e.g., 1 ms), performs the following ECCA and channel reservation operations (subframe #9, 1001), and thus avoids the conflict with subframe #0 (902) transmitting the following PSS and SSS. Although the embodiment of FIG. 10 is described, assuming that the LTE-U eNB performs ECCA and channel reservation operations earlier by 1 ms, it should be understood that the present invention is not limited thereto. It may also be modified in such a way that the LTE-U eNB performs ECCA and channel reservation operations, moving up from 1 ms to 4 ms as a timing after subframe #5 transmitting the previous PSS and SSS, in the situation described above. Although 4 subframes are used for the signal transmission according to the LTE system as in the embodiment referring to FIG. 8B, if an eNB performs ECCA and channel reservation operations in subframe #0 and #5, the method can be used to prevent the eNB from continuously performing ECCA and channel reservation operations in subframe #0 and #5.

Figure 11:
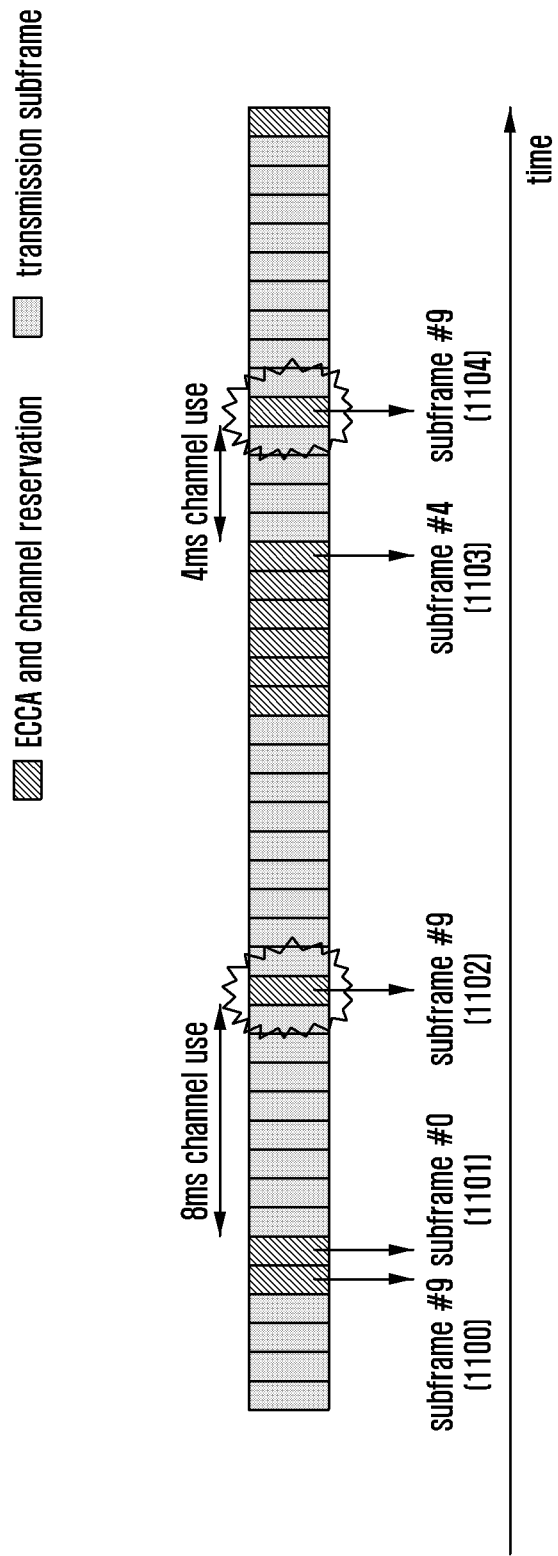
FIG. 11 is a diagram showing a second embodiment for protecting important signals, such as PSS, SSS, etc., resolving the problem in the embodiment shown in FIG. 9.

FIG. 11 is a diagram showing a second embodiment for protecting important signals, such as PSS, SSS, etc., resolving the problem in the embodiment shown in FIG. 9.

With reference to FIG. 11, regardless of times that a previous ECCA and channel reservation timing is ended and the channel use starts, an LTE-U eNB: stops using a channel at a fixed subframe number (e.g., subframe #9, 1102 and 1104); performs ECCA and channel reservation operations; and thus prevents the conflict between the transmission of PSS and SSS and the ECCA channel reservation operations. Although the embodiment shown in FIG. 11 is implemented in such a way that ECCA and channel reservation operations are performed in subframe #9, it should be understood that the present invention is not limited thereto. It may also be modified in such a way that the LTE-U eNB may use all the subframes, except for subframe #0 -#5 transmitting PSS and SSS, as fixed timings of ECCA and channel reservation operations. The method according to the embodiment shown in FIG. 11 is disadvantageous because it stops the transmission and more frequently performs ECCA and channel reservation operations, which cause to lower the use of resources, compared with the method according to the first embodiment. On the other hand, the method according to the embodiment shown in FIG. 11 is advantageous because it has fixed start timings of ECCA and channel reservation operations and thus UE can detect the start timings of ECCA and channel reservation operations without determining whether transmission is stopped. Although 4 subframes are used for the signal transmission according to the LTE system as in the embodiment referring to FIG. 8B, the method can be used as a method that sets an eNB to perform ECCA and channel reservation operations in subframe #9 and #4.

Figure 12:
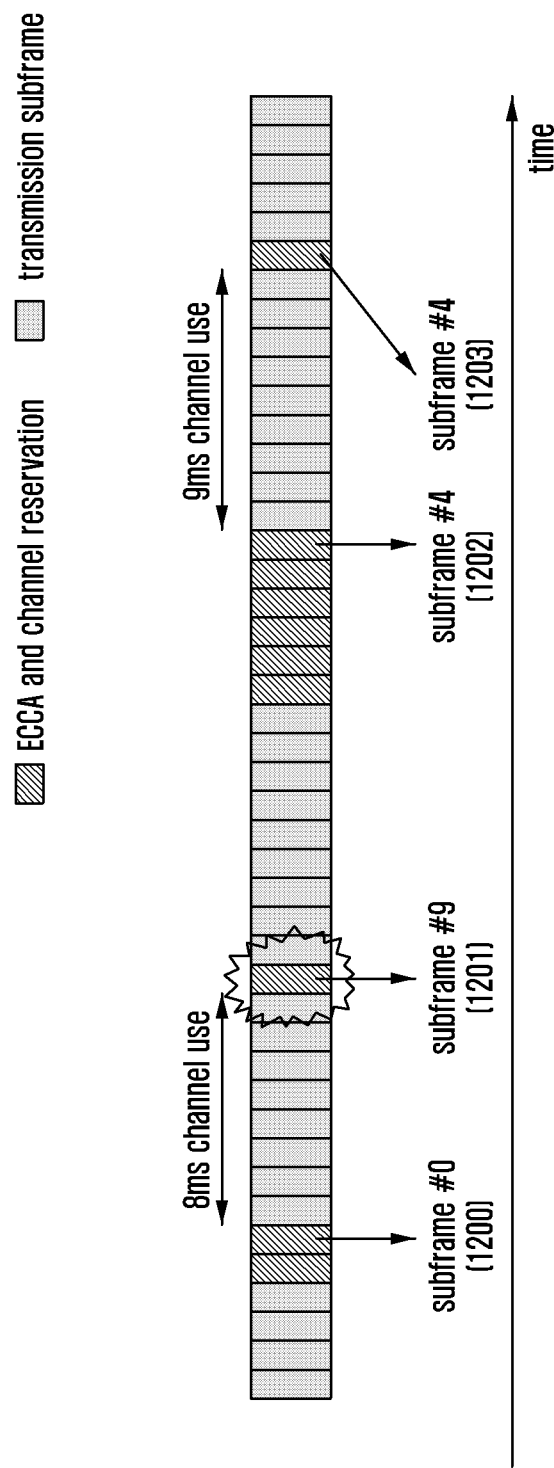
FIG. 12 is a diagram showing a third embodiment for protecting important signals, such as PSS, SSS, etc., resolving the problem in the embodiment shown in FIG. 9.

FIG. 12 is a diagram showing a third embodiment for protecting important signals, such as PSS, SSS, etc., resolving the problem in the embodiment shown in FIG. 9.

The method according to the embodiment shown in FIG. 12 is implemented to supplement the disadvantages of the embodiment shown in FIG. 11 and maintain the advantages. The method according to the embodiment shown in FIG. 12 is a method of determining whether a timing of the following ECCA and channel reservation operation starts in subframe #m or subframe #(m+5), depending on times when timings of previous ECCA and channel reservation operations are ended and the use of channel starts. Since PSS and SSS are transmitted in subframe #0 and #5, corresponding that two subframes need to be protected against conflicting with ECCA and channel reservation operations, if the last subframe of a specific ECCA and channel reservation operation interval corresponds to one of #9, #0 (1200), #1, #2, or #3, the LTE-U eNB performs the following ECCA and channel reservation operations in the following subframe #9 (1201). If the last subframe of a specific ECCA and channel reservation operation interval corresponds to one of #4 (1202), #5, #6, #7 or #8, the LTE-U eNB performs the following ECCA and channel reservation operations in the following subframe #4 (1203). The method according to the embodiment shown in FIG. 12 is capable of maintaining a channel use interval between 5 ms and 9 ms after the timings of ECCA and channel reservation operations and simultaneously avoiding the continuous conflict between the transmission timing of PSS and SSS and the timings of ECCA and channel reservation operations.

Figure 13:
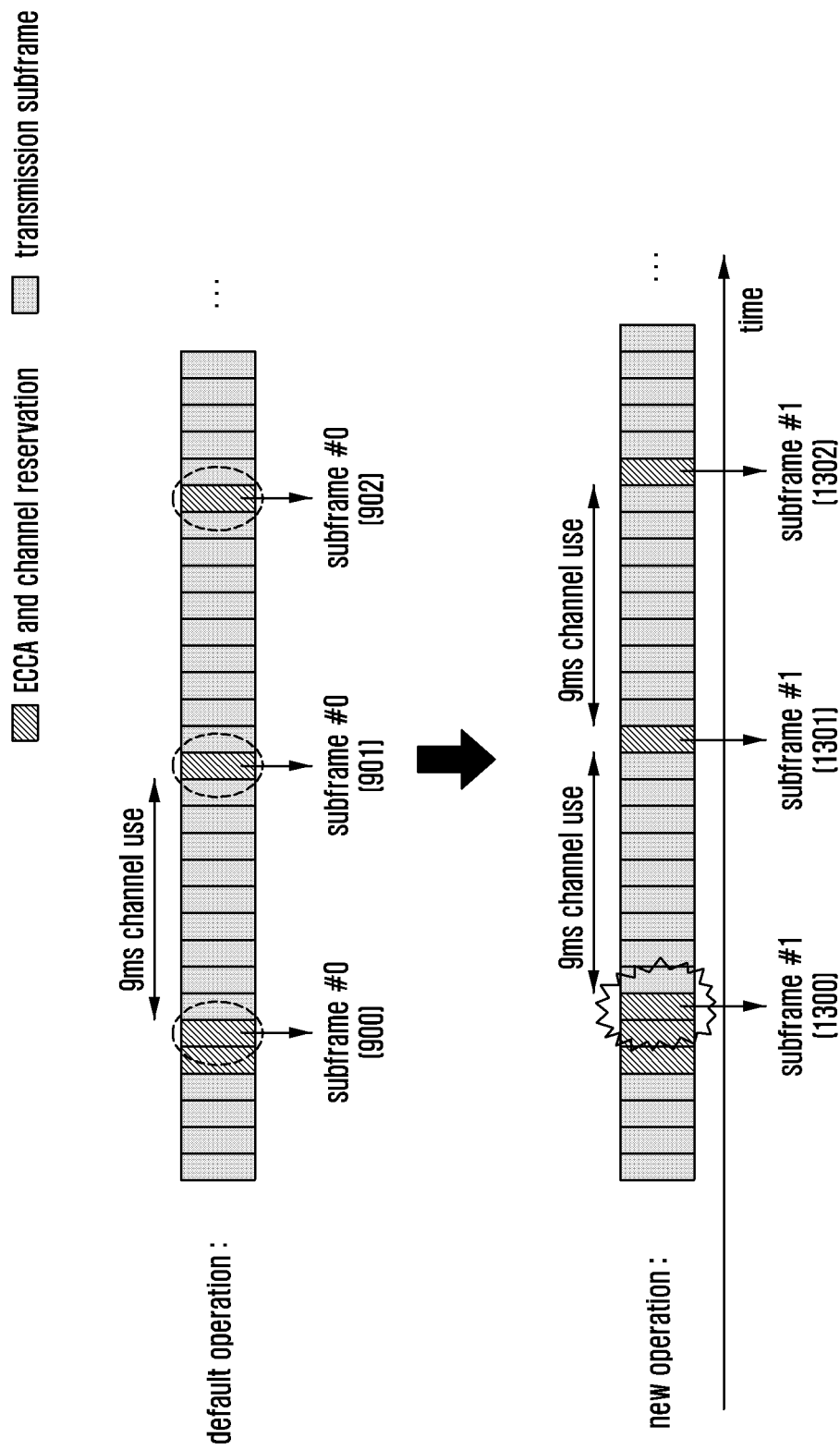
FIG. 13 is a diagram showing a fourth embodiment for protecting important signals, such as PSS, SSS, etc., resolving the problem in the embodiment shown in FIG. 9.

FIG. 13 is a diagram showing a fourth embodiment for protecting important signals, such as PSS, SSS, etc., resolving the problem in the embodiment shown in FIG. 9.

With reference to FIG. 13, if an LTE-U eNB ascertains that the last subframe #0 (900) of its specific ECCA and channel reservation operation interval conflicts with the transmission of PSS and SSS, the LTE-U eNB performs the ECCA and channel reservation operations by extending the number of subframes by one or more subframes (i.e., up to subframe #1 (1300)) and during the extended subframes, so as not to conflict the transmission of PSS and SSS after using the following maximum channel with the ECCA and channel reservation operations. Although the method according to the embodiment shown in FIG. 13 is capable of simply avoiding the conflict between the transmission of PSS and SSS and the ECCA and channel reservation operation, it is disadvantageous because it has difficulty preventing the continuous conflict between DRS and ECCA and channel reservation operations which will be described below.

Figure 14:
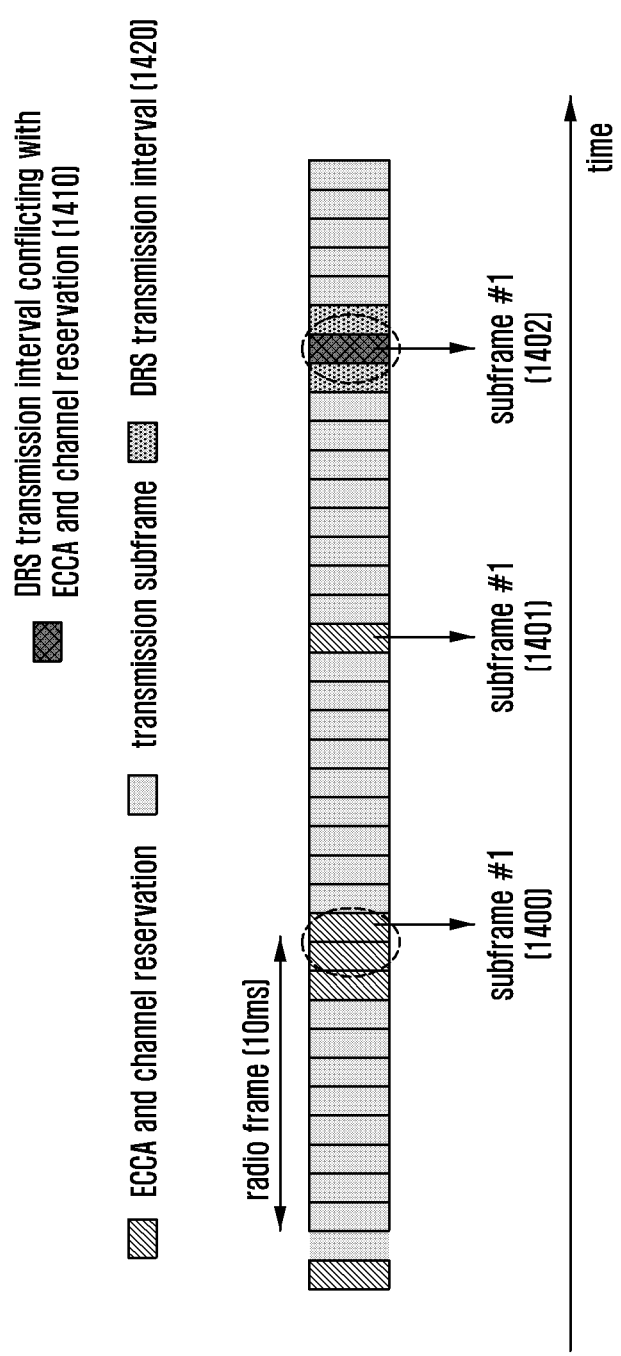
FIG. 14 is a diagram that describes a state where an LTE-U eNB performs the transmission and the channel detection.

FIG. 14 is a diagram that describes a state where an LTE-U eNB performs the transmission and the channel detection.

An LTE-U eNB performs ECCA and channel reservation operations in subframe #9 at the initial transmission as in a state shown in FIG. 8, and then performs the transmission as an LTE-A from subframe #0 to #8. However, there may be a case where a transmission of another device is generated in a specific ECCA interval, and thus the LTE-U eNB needs to continue performing an ECCA in subframe #0 and subframe #1 (1400) according to the regulatory particulars. In this case, PSS and SSS cannot be transmitted via subframe #0. Since the situation occurred, if an LTE-U eNB 9 uses subframes for the transmission and continues performing ECCA and channel reservation operations in the following one subframe, according to the LTE-U transmission method, subframe #1 (1402 and 1410) where an interval where ECCA channel reservation operations are performed and a DRS transmission interval 1420 of a corresponding LTE-U eNB are overlapped are generated. In this case, part of a reference signal in a DRS interval is not transmitted. Therefore, it is difficult to measure DRS of UEs connected to a corresponding LTE-U eNB and UEs connected to its neighboring eNB.

Figure 15:
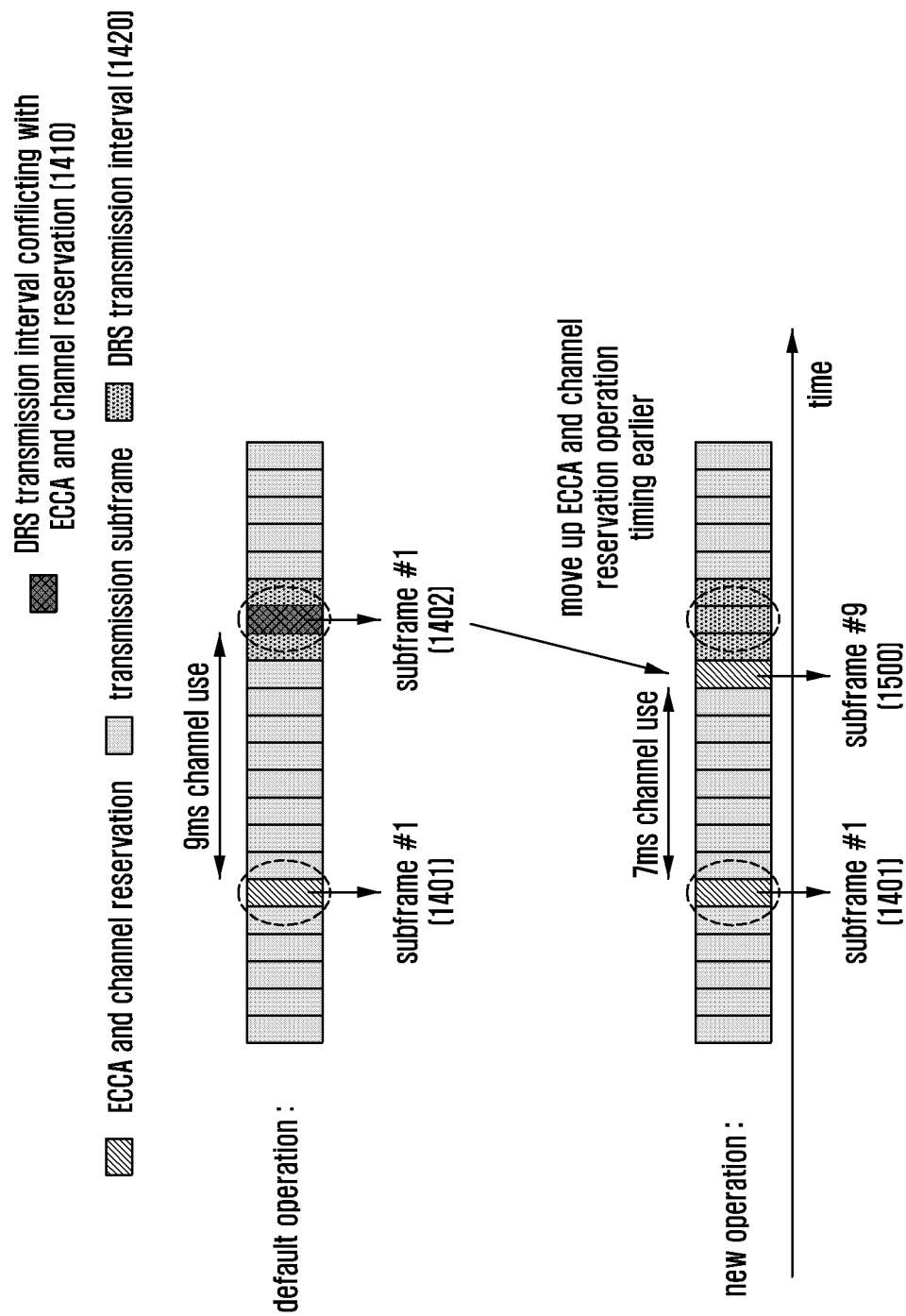
FIG. 15 is a diagram showing a first embodiment for protecting the DRS transmission, resolving the problem in the embodiment shown in FIG. 14.

A situation where the transmission of PSS and SSS of FIG. 15 conflicts with the ECCA and channel reservation operations is not avoidable because the situation is caused by restricting unlicensed bands. However, after that, a situation where the DRS interval conflicts with the ECCA and channel reservation operations can be avoided by adjusting the timings of ECCA and channel reservation operations.

FIG. 15 is a diagram showing a first embodiment for protecting the DRS transmission, resolving the problem in the embodiment shown in FIG. 14.

The method according to the embodiment shown in FIG. 15 is to move up an ECCA and channel reservation operation timing to before a subframe transmitting a corresponding DRS. Although a corresponding LTE-U eNB has an available maximum channel use time, the LTE-U eNB previously performs ECCA and channel reservation operations in subframe #9 (1500), so that the corresponding LTE-U eNB can operate without violating the regulations and avoid a situation where the ECCA and channel reservation operations conflict with the transmission of DRS. That is, unlike a process where a given maximum channel use time is always maximally used as a default operation shown in FIG. 14, if the LTE-U eNB performs ECCA and channel reservation operations according to a new operation as shown in FIG. 15, the DRS transmission operations in subframe #0, #1, #2 can be naturally protected.

That is, in a new operation of FIG. 15, if the LTE-U eNB ascertains that a specific interval of ECCA and channel reservation operations may conflict with a subframe transmitting DRS, the LTE-U eNB does not perform the transmission using all of the maximum channel use times, but stops the transmission earlier by a number of subframes before the DRS transmission occurs, previously performs the following ECCA and channel reservation operations, and thus avoids the conflict with an interval transmitting the following DRS. Although the embodiment of FIG. 15 is described, assuming that the LTE-U eNB performs ECCA and channel reservation operations in a subframe right before an DRS transmission interval, it should be understood that the present invention is not limited thereto. It may be modified in such a way that the LTE-U eNB performs ECCA and channel reservation operations in a subframe which moves up as long as the ECCA and channel reservation operation does not conflict with the DRS transmission.

As described above, since the first subframe of DRS needs to include SSS, it is natural for the first subframe of DRS to be located in subframe #0 or subframe #5. Therefore, the operation methods of an LTE-U eNB according to the first, second and third embodiments, which resolve the problem described in the embodiment referring to FIG. 9 and avoid the continuous conflict between the transmission of PSS and SSS and the ECCA and channel reservation operations, may also be used as a method of avoiding the conflict between the DRS and the ECCA and channel reservation operations. That is, in order to protect important signals such as DRS or PSS and SSS, although a maximum channel use time which is available, ECCA and channel reservation operations are performed in a subframe with a specific period and an offset, thereby preventing the conflict with corresponding important signals.

Figure 16:
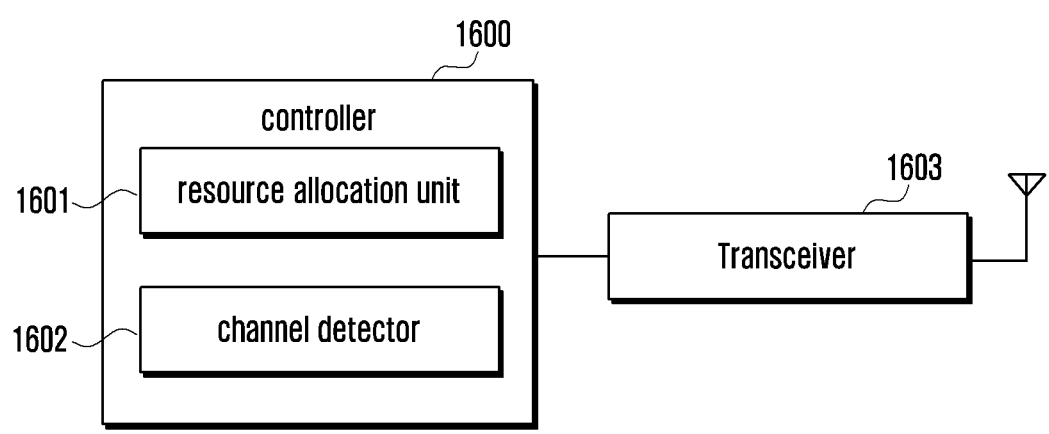
FIG. 16 is a block diagram of an eNB according to embodiments of the present invention.

FIG. 16 is a block diagram of an eNB according to embodiments of the present invention.

With reference to FIG. 16, an eNB includes a controller 1600 and a transceiver 1603. The controller 1600 controls functions and states of the components in the eNB. More specifically, the controller 1600 allocates resources, such as DRS for estimating a channel of UE, etc., to UE. The controller 1600 allocates detailed information regarding a channel measurement value report to UE. To this end, the controller 1600 may further include a resource allocation unit 1601. The controller 1600 determines whether a channel is available via the channel detection in order to satisfy regulatory particulars for an unlicensed band, and sets a timing to perform an ECCA channel reservation operation, considering resources transmitting DRS, PSS and SSS. In order to determine whether the channel is available, the controller 1600 may further include a channel detector 1602. That is, the resource allocation unit 1601 allocates, to UE, various channel measurement resources, and also additional information required for the channel measurement and report. The channel detector 1602 detects a channel at an ECCA timing, determined according to the embodiment, and determines whether the channel is available.

The transceiver 1603 performs transmits/receives, to/from UE, data, control information, reference signals, resource allocation information, PSS, SSS, DRS, etc. The transceiver 1603 transmits signals, such as DRS, PSS, SSS, etc., to UE, via an allocated resource, under the control of the controller 1600. The transceiver 1603 receives channel information from UE. The transceiver 1603 receives, from other transmission devices, a signal for detecting whether a channel of an unlicensed band is available.

Although the embodiment of FIG. 16 is shown in such a way that the controller 1600, the resource allocation unit 1601 and channel detector 1602 are configured as separate blocks, it should be understood that the present invention is not limited thereto. For example, it may be modified in such a way that the controller 1600 performs functions of the resource allocation unit 1601 and the channel detector 1602.

Figure 17:
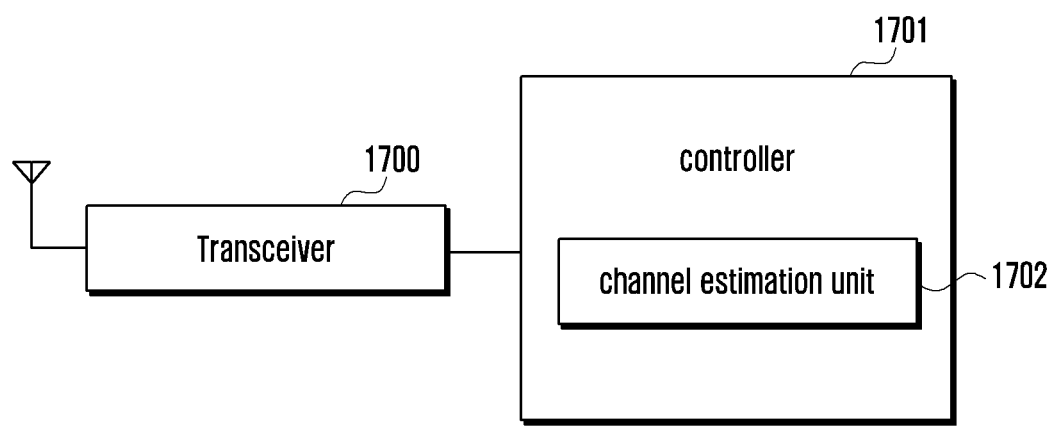
FIG. 17 is a block diagram of UE according to embodiments of the present invention.

FIG. 17 is a block diagram of UE according to embodiments of the present invention.

With reference to FIG. 17, UE includes a transceiver 1700 and a controller 1701. The transceiver 1700 transmits/receives DRS, PSS, SSS, control information, data, etc. to/from an external (e.g., eNB). The transceiver 1700 is capable of transmitting reception power information and feedback information to an eNB under the control of the controller 1701.

The controller 1701 controls functions and states of the components in the UE. More specifically, the controller 1701 receives PSS and SSS from the eNB, obtains time/frequency synchronization, and creates reception power information regarding DRS in allocated information. The controller 1701 controls the transceiver 1700 to report, to an eNB, channel information created at a timing which is set or allocated by the eNB. To this end, the controller 1701 may include a channel estimation unit 1702.

The channel estimation unit 1702 estimates a required channel via DRS and information related to an allocated resource, received from an eNB, and creates reception power information and feedback information.

Although the embodiment of FIG. 17 is shown in such a way that UE includes a transceiver 1700 and a controller 1701, it should be understood that the present invention is not limited thereto. It should be understood that UE may further include various types of components according to its functions. For example, UE may further include a display unit for displaying states of the UE, an input unit for receiving signals related to the execution of functions from the user, a storage unit for storing data created as UE operates, etc. Although the embodiment of FIG. 17 is shown in such a way that the controller 1701 and the channel estimation unit 17 are configured as separate blocks, it should be understood that the present invention is not limited thereto. For example, it may be modified in such a way that the controller 1701 performs functions of the channel estimation unit 1702.

The invention claimed is:

1. A method for performing channel detection in an unlicensed band by a base station in a wireless communication system, the method comprising:
   identifying a first subframe in which a clear channel assessment (CCA) is to be performed by the base station;
   identifying, whether a second subframe in which a transmission of a primary synchronization signal (PSS) and a secondary synchronization signal (SSS) or a transmission of a discovery reference signal (DRS) is to be performed by the base station, is overlapped with the first subframe;
   identifying a third subframe instead of the first subframe to perform the CCA, in case that the second subframe is overlapped with the first subframe; and
   performing the CCA in the third subframe.

2. The method of claim 1, further comprising:
   occupying a channel for a first time less than a maximum channel use time; and
   performing the CCA after the channel is occupied.

3. The method of claim 2, wherein:
   the first time is 8 ms, 7 ms or 6 ms if the maximum channel use time is 9 ms; and
   the first time is 3 ms or 2 ms if the maximum channel use time is 4 ms.

4. The method of claim 2, wherein:
   the CCA is performed in a subframe #9 or a subframe #4, based on the maximum channel use time being 9 ms; and
   the CCA is performed in the subframe #4 and the subframe #9, based on the maximum channel use time being 4 ms.

5. The method of claim 2, wherein:
   the CCA is performed in a subframe #9, based on a last subframe included in an interval for the CCA being the subframe #9, a subframe #0, a subframe #1, a subframe #2 or a subframe #3; and
   the CCA is performed in a subframe #4, based on a last subframe included in an interval for the CCA being the subframe #4, a subframe #5, a subframe #6, a subframe #7 or a subframe #8.

6. The method of claim 2, further comprising:
   occupying the channel during the maximum channel use time after performing the CCA.

7. A base station for performing channel detection in an unlicensed band in a wireless communication system, the base station comprising:
   a transceiver configured to transmit and receive a signal; and
   a processor configured to:
   identify a first subframe in which a clear channel assessment (CCA) is to be performed by the base station;
   identify whether a second subframe in which a transmission of a primary synchronization signal (PSS) and a secondary synchronization signal (SSS) or a transmission of a discovery reference signal (DRS) is to be performed by the base station, is overlapped with the first subframe;
   identify a third subframe instead of the first subframe to perform the CCA, in case that the second subframe is overlapped with the first subframe; and
   perform the CCA in the third subframe.

8. The base station of claim 7, wherein the processor is further configured to:
   occupy a channel for a first time less than a maximum channel use time, and
   perform the CCA after the channel is occupied.

9. The base station of claim 8, wherein:
   the first time is 8 ms, 7 ms or 6 ms if the maximum channel use time is 9 ms; and
   the first time is 3 ms or 2 ms if the maximum channel use time is 4 ms.

10. The base station of claim 8, wherein:
    the CCA is performed in a subframe #9 or a subframe #4, based on the maximum channel use time being 9 ms; and
    the CCA is performed in the subframe #4 and the subframe #9, based on the maximum channel use time being 4 ms.

11. The base station of claim 8, wherein:
    the CCA is performed in a subframe #9, based on a last subframe included in an interval for the CCA being the subframe #9, a subframe #0, a subframe #1, a subframe #2 or a subframe #3; and
    the CCA is performed in a subframe #4, based on a last subframe included in an interval for the CCA being the subframe #4, a subframe #5, a subframe #6, a subframe #7 or a subframe #8.

12. The base station of claim 8, wherein the processor is further configured to occupy the channel during the maximum channel use time after performing the CCA.

* * * * *